United States Patent [19]

Hornsby, Jr. et al.

[11] Patent Number: 4,862,817
[45] Date of Patent: Sep. 5, 1989

[54] WATER VEHICLE

[75] Inventors: Howard C. Hornsby, Jr., 1221 Wynnedale Rd., West Palm Beach, Fla. 33417; Robert J. Murphy, 1916 Pleasant Dr., Juno, Fla.

[73] Assignees: Howard C. Hornsby, Jr.; Robert J. Murphy

[21] Appl. No.: 147,170

[22] Filed: Jan. 22, 1988

[51] Int. Cl.⁴ .............................................. B63B 1/38
[52] U.S. Cl. ...................... 114/67 A; 114/56; 114/67 R; 114/288; 114/289
[58] Field of Search ............... 114/288, 271, 289, 290, 114/56, 67 A, 67 R, 272, 273; 440/37

[56] References Cited

U.S. PATENT DOCUMENTS

| D. 160,027 | 9/1950 | Smith | 114/290 |
|---|---|---|---|
| 2,272,661 | 2/1942 | Finley | 440/37 |
| 2,965,061 | 12/1960 | Bank et al. | 114/290 |
| 3,191,572 | 6/1965 | Wilson | 114/67 A |
| 3,223,066 | 12/1965 | Irving | 114/290 |
| 3,455,266 | 7/1969 | Giles | 114/67 A |
| 3,902,445 | 9/1975 | Stolk | 114/289 |
| 3,918,382 | 11/1975 | Austin | 114/273 |
| 4,019,699 | 4/1977 | Wintersdorff et al. | 244/15 |
| 4,341,177 | 7/1982 | Miyazaki et al. | 114/288 |
| 4,393,802 | 7/1983 | Rizzo | 114/289 |
| 4,523,536 | 6/1985 | Smoot | 114/290 |
| 4,708,085 | 11/1987 | Blee | 114/290 |

FOREIGN PATENT DOCUMENTS

| 2457803 | 1/1981 | Fed. Rep. of Germany | 114/290 |
|---|---|---|---|
| 55-1238 | 8/1980 | Japan | 114/67 R |
| 11023 | of 1912 | United Kingdom | 114/67 R |

Primary Examiner—Sherman D. Basinger
Assistant Examiner—Thomas J. Brahan
Attorney, Agent, or Firm—Anthony J. De Laurentis

[57] ABSTRACT

A water vehicle includes a longitudinally elongated hull having a first portion adapted to separate the water by movement of the hull through the water. Foam is generated by the separation of the water. A second portion of the hull is adapted to contain the foam underneath the hull. The vehicle will be supported during propulsion at least in part by a surface of the foam.

17 Claims, 8 Drawing Sheets

WATER VEHICLE

BACKGROUND OF THE INVENTION

1. Field of the Invention

This invention relates generally to water vehicles, and more particularly to hulls for water vehicles.

2. Description of the Prior Art

Boat hulls have been designed for speed and designed for stability. Those designs that are intended for speed generally have as an object the reduction of friction during propulsion through the water. It is therefore usually a part of these designs to minimize contact between the hull and the water. This principle is applied in high-speed power boat racing, where watercraft known as hydroplanes employ aerodynamic principles to substantially lift the vehicle from the water during propulsion to minimize contact between the vehicle and the water and thus to minimize also the resulting friction. These designs tend to be very unstable and can be seen to flutter at high speeds. They occasionally leave the water entirely and sometimes flip over. These vehicles are often difficult to steer because they tend to skid over the water as a result of the minimal contact which the hull has with the water.

Boat hull designs intended for stability must generally increase contact between the hull and the water. Contact between the hull and the water over a relatively large area, or at least in a number of different locations, is usually necessary to provide the requisite stability. It commonly is also necessary that these vehicles have a substantial draft. The increased contact between the hull and the water will increase friction and decrease the maximum speed of the vehicle.

There is a need for a water vehicle that is stable, yet minimizes friction between the hull and the water for the best possible speed characteristics. An optimization of speed and stability is essential where it is desired to carry sensitive payloads through the water at the maximum possible speed. It is also desirable that such a vehicle have the minimum possible draft to increase the versatility of the craft.

SUMMARY OF THE INVENTION

It is an object of the invention to provide a method of propelling a vehicle through the water which will provide favorable speed and stability characteristics.

It is another object of the invention to provide a water vehicle that will be able to carry payloads of substantial weight.

It is yet another object of the invention to provide a water vehicle which will have a shallow draft.

It is still another object of the invention to provide a vehicle with good steering and handling characteristics.

These and other objects are accomplished by a water vehicle with a longitudinally elongated hull having forward and aft portions, upper and lower portions, and lateral side portions. A first portion of the hull is adapted to break the water by movement of the hull through the water, generating foam. A second portion of the hull is adapted to contain the foam beneath the hull such that the vehicle will be supported during propulsion at least in part by a surface of the foam.

The hull will lift from the water during propulsion. A third portion of the hull is provided to maintain contact between the hull and the foam as the hull lifts from the water during propulsion of the vehicle.

The structure for separating the water preferably also directs the water laterally outward toward each lateral side of the hull. Structure is preferably provided to impact this laterally outward moving foam. The force of this impact on each lateral side of the structure for separating the water is substantially countervailing. The countervailing impact force tends to stabilize the hull against yaw and prevents skidding of the hull over the foam. The force also helps to enhance the steering characteristics of the vehicle.

The structure for separating the water is located at least in the lower forward portion of the hull. This structure can be a protusion from the hull which is adapted to direct the foam laterally outward from each lateral side of the protusion.

The hull structure that is adapted to contain the foam beneath the hull preferably includes a longitudinal foil substantially at each lower lateral side portion of the hull. The foils preferably extend for substantially the longitudinal length of the hull. The foils will contain the foam beneath the hull such that laterally interior portions of the hull will be supported during propulsion of the vehicle at least in part by a surface of the foam.

At least one longitudinal strake can be provided laterally inward from each longitudinal foil. The longitudinal strakes extend at least through the aft, lower portion of the hull. The strakes are adapted to maintain contact with the foam as the hull lifts from the water with increasing velocity of travel.

Substantially concave surfaces are located adjacent to the longitudinal foils. The concave surfaces, define with the surface of the water, channels which receive the foam as it flows aft across the hull. These channels give lift and stability to the hull as the gas bubbles of the foam are squeezed between the concave surface and the water. The hull will lift from the water as the velocity of the hull increases. Other concave surfaces of reduced vertical height can provide channels between the surface of the water and the hull to receive foam at other heights of the hull relative to the water. This will maintain lift and stability, as the height of the hull changes.

The lateral cross-section of the strakes preferably slopes substantially downward in the direction of the lateral side portions of the hull. Foam directed laterally outward will impact the downward sloping surfaces so formed on each lateral side of the hull. The force of the impact toward each lateral side portion is substantially countervailing such that yaw is resisted and skidding of the hull over the foam is reduced.

The vehicle is preferably propelled by a water jet propulsion system. The water jet propulsion system includes a water inlet port, a water outlet port, and a water pump for propelling water from the water inlet port through the water outlet port. The water outlet port is directed abaft, or to the rear of the vehicle, to propel the vehicle substantially forward. The water inlet port is in the lower aft portion of the hull, whereby water drawn through the water inlet port will draw the lower aft portion of the hull downward into the water. This will assist in maintaining contact between the hull and the foam surface. The water inlet port can be directed slightly forward. The water inlet port will then function somewhat as a scoop and a portion of the water passing below the hull will travel into the water inlet port.

The vehicle also can comprise a superstructure adapted to house an engine. The superstructure preferably has curved surfaces adapted to deflect projectiles and wave radiations such as radar. The curved surfaces can be compound curves.

A fluid channel can be provided in the superstructure to direct fluid (air and water) flowing over the vehicle in a direction substantially parallel to the longitudinal axis of the vehicle. This will assist in reducing drag and yaw.

The invention includes a method for propelling a vehicle through water which includes the steps of separating the water with a first portion of the hull, generating foam. The foam is contained underneath the hull by a second portion of the hull such that the vehicle will be supported during propulsion at least in part by a surface of the foam. The foam is kept in contact with the hull as the hull raises from the water with increasing velocity of travel, to maintain lift and stability.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

A longitudinally elongated hull 28 having forward and aft portions, upper and lower portions and lateral side portions, is shown in FIGS. 1–10. A lower, forward portion is adapted to separate the water as the hull is propelled through the water, generating foam. A protrusion 32 can be provided at least in the lower, forward portion to separate the water as the vehicle is propelled through the water. The protrusion 32 is adapted to direct the foam outward toward lateral side portions of the hull. Longitudinal foils 36 and 38 are provided substantially at each lower lateral side portion of the hull. The longitudinal foils 36, 38 are adapted to contain the foam beneath the hull such that laterally interior portions of the hull will be supported during propulsion at least in part by a surface of the foam. The foam acts as a bearing surface which supports the vehicle but with a reduction in friction relative to an equivalent contact with water. The draft of the vehicle is minimal owing to its support on the surface foam layer of the water.

The longitudinal foils preferably extend substantially for the longitudinal length of the hull 28. A substantially concave surface is preferably provided laterally inward from the longitudinal foils. The concave surface extends for substantially the length of each longitudinal foil and creates a rolling, foaming action which supports the formation and maintenance of the foam. A concave surface 37 is provided laterally inward from the longitudinal foil 36 and a concave surface 39 is provided laterally inward from the longitudinal foil 38.

At least one longitudinal strake can be provided laterally inward from each of the longitudinal foils 36, 38. A longitudinal strake 46 is provided laterally inward from the longitudinal foil 36. A longitudinal strake 48 is provided laterally inward from the longitudinal foil 38. The longitudinal strakes 46, 48 are adapted to maintain contact with the foam with increasing velocity of travel. The longitudinal strakes 46, 48 provide downwardly depending surfaces that will maintain contact with the foam as the hull 28 lifts from the water. The longitudinal strakes 46, 48 can extend for substantially the length of the hull 28, although it is necessary only that they be located at least in the lower, aft portion of the hull 28. The longitudinal strakes 46, 48 will be most effective at increased velocities of travel, when forward portions of the hull 28 will often be lifted from the surface of the water.

Figure 1:
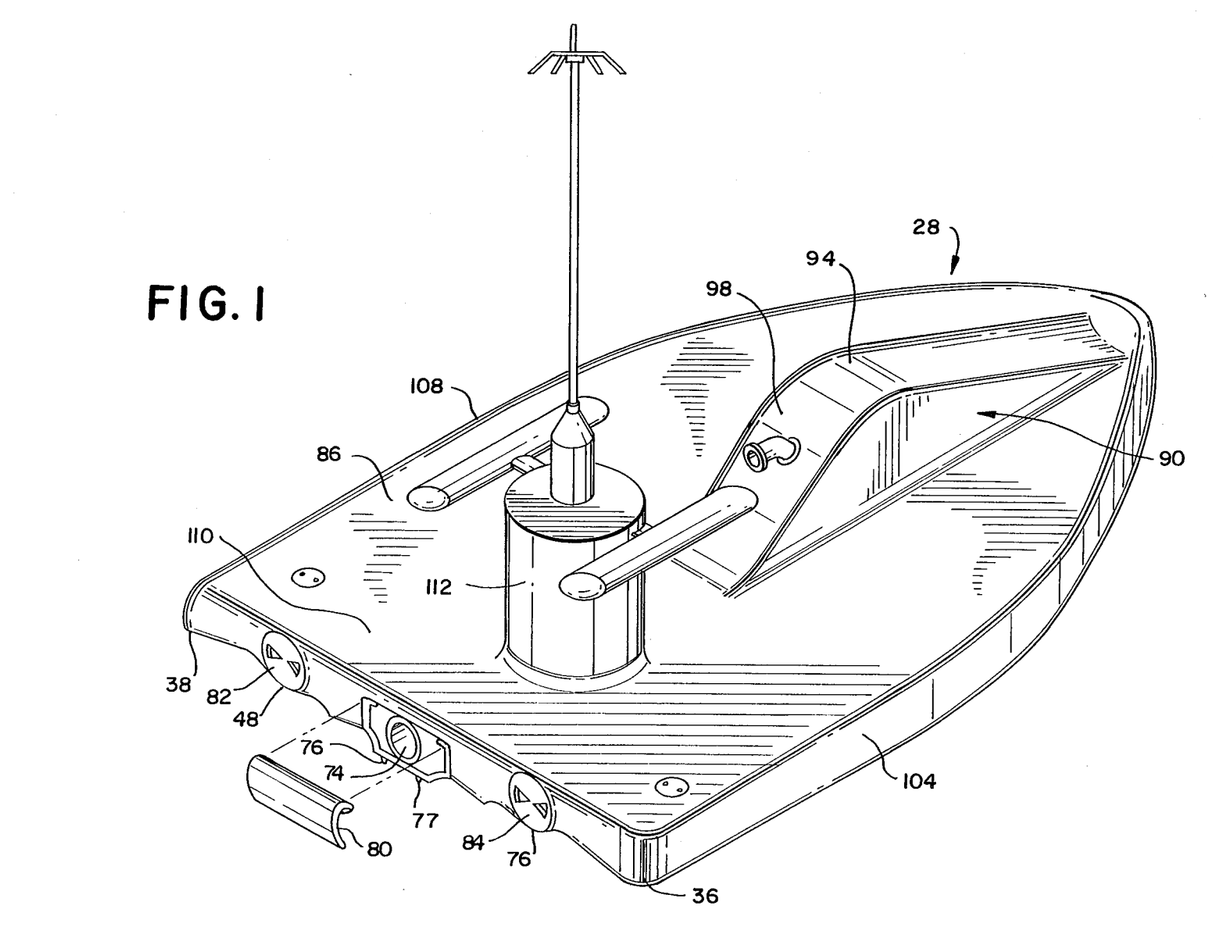
FIG. 1 is a rear perspective, exploded in part, of a water vehicle according to the invention.
Figure 2:
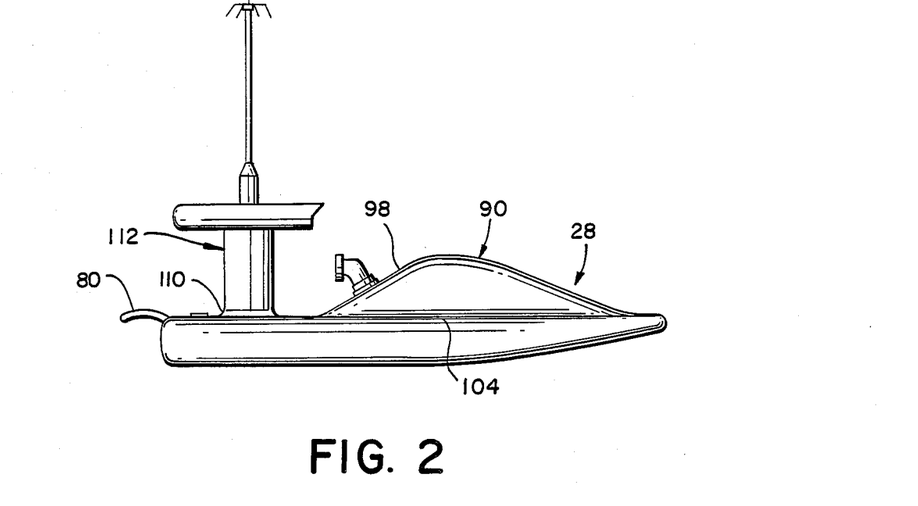
FIG. 2 is a right side elevation.
Figure 3:
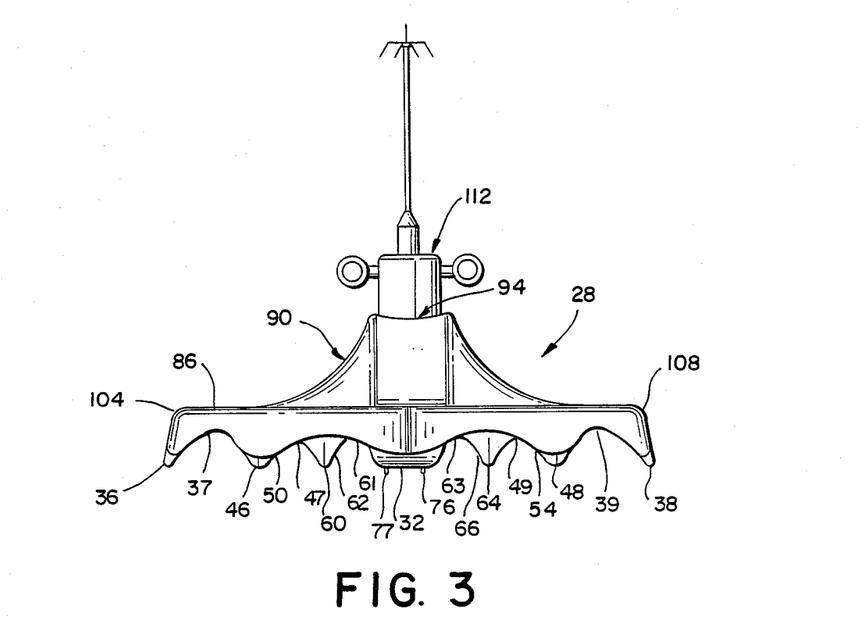
FIG. 3 is a front elevation.
Figure 4:
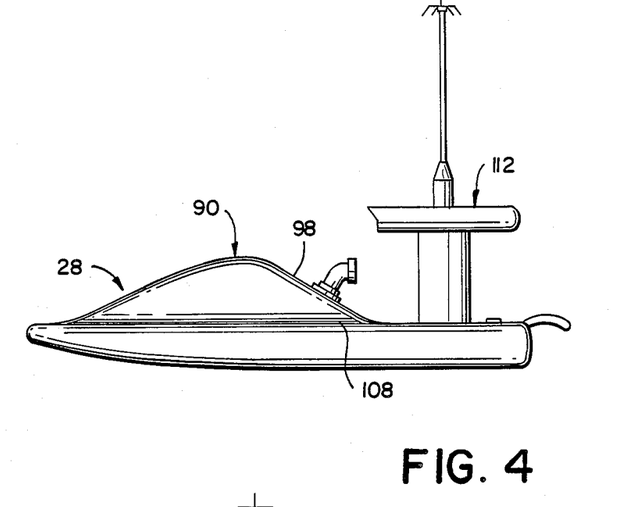
FIG. 4 is a left side elevation.
Figure 5:
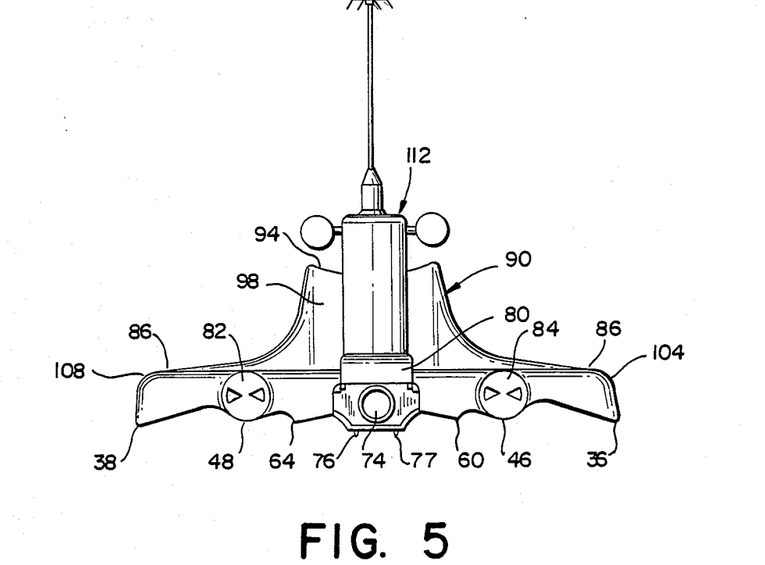
FIG. 5 is a rear elevation.
Figure 6:
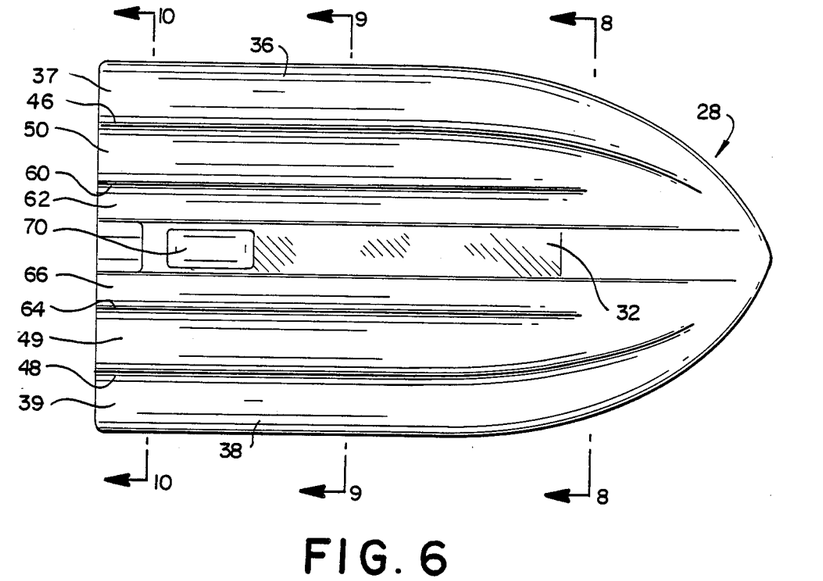
FIG. 6 is a bottom view.
Figure 7:
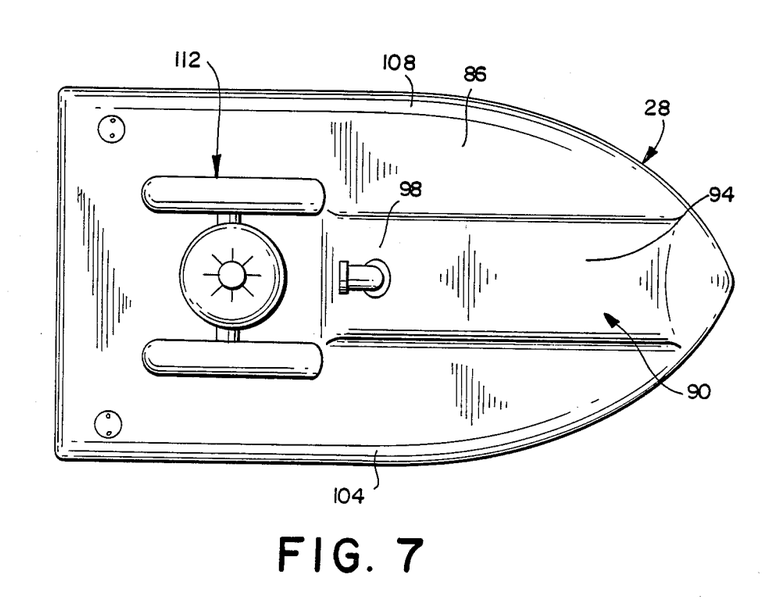
FIG. 7 is a plan view.
Figure 8:
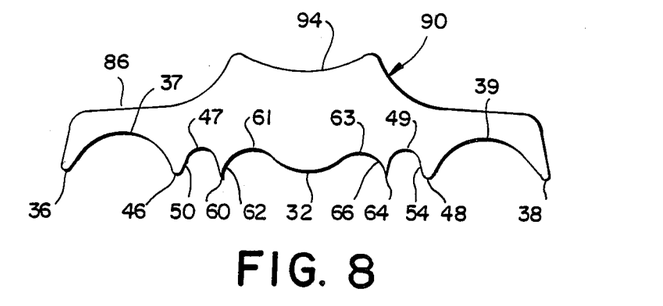
FIG. 8 is a cross-section taken along line 8—8 in FIG. 6.
Figure 9:
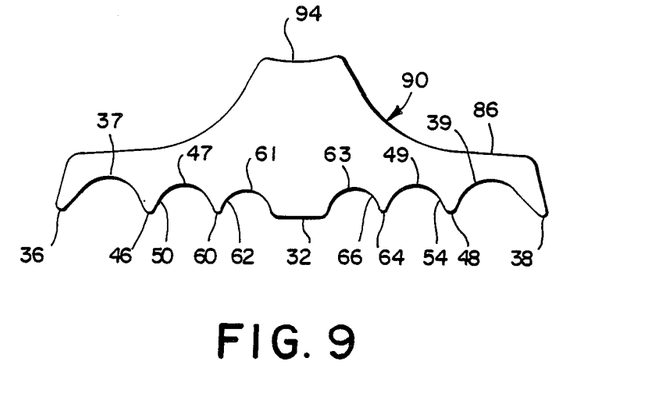
FIG. 9 is a cross-section taken along line 9—9 in FIG. 6.
Figure 10:
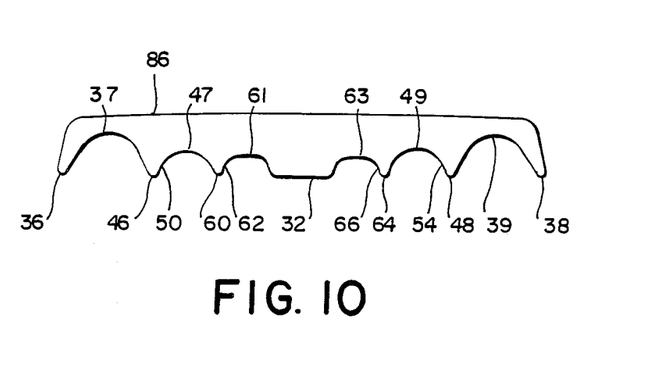
FIG. 10 is a cross-section taken along line 10—10 in FIG. 6.
Figure 11:
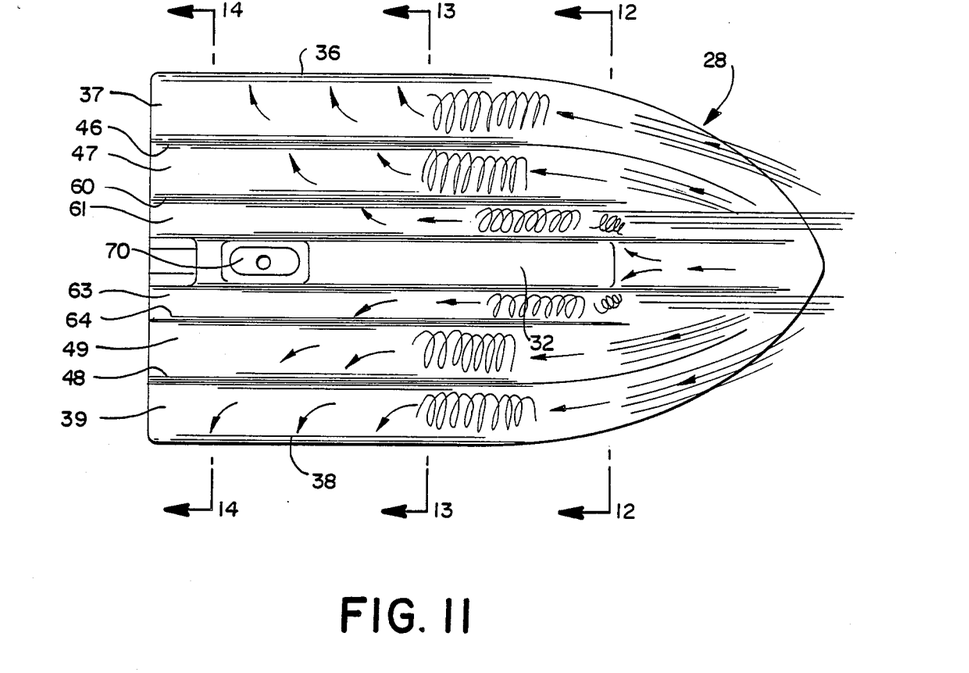
FIG. 11 is a bottom view depicting the flow of water relative to the hull.

The longitudinal strakes 46, 48 preferably slope substantially downward in the direction of the lateral side portions of the hull 28. The strake 46 can have a downward sloping surface 50 and the strake 48 can have a downward sloping surface 54. Foam directed laterally outward will impact the downward sloping surfaces 50 and 54 substantially in the direction of each lateral side of the hull, as shown by the arrows in FIG. 11. The force of the impact will be substantially countervailing so that the vehicle will tend to track forward, reducing yaw and skidding of the hull over the foam.

Two longitudinal strakes are preferably provided on each lateral side of the hull for increased effectiveness. A second longitudinal strake 60 with a laterally downward sloping surface 62 can be provided laterally inward from the longitudinal strake 46. A second longitudinal strake 64 with a laterally downward sloping surface 66 can be provided laterally inward from the longitudinal strake 48.

Figure 12:
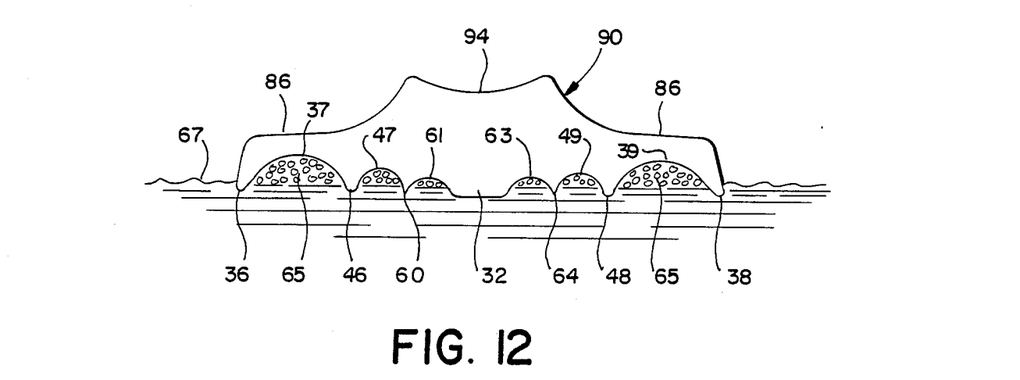
FIG. 12 is a cross-section taken along line 12—12 in FIG. 11.
Figures 13, 14:
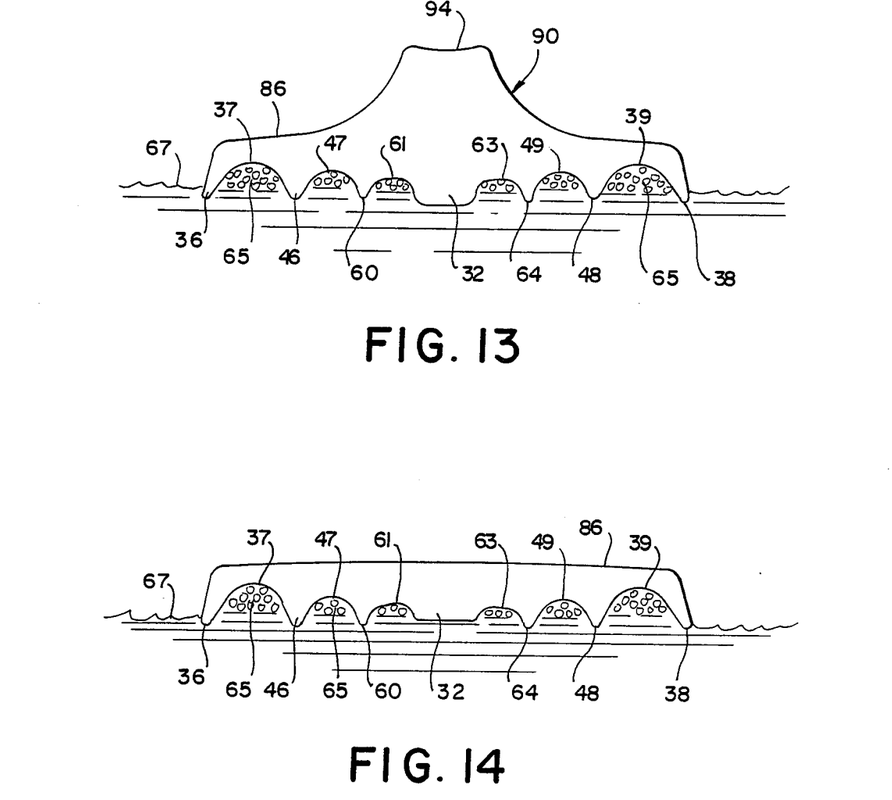
FIG. 13 is a cross-section taken along line 13—13 in FIG. 11.
FIG. 14 is a cross-section taken along line 14—14 in FIG. 11.

Substantially concave surfaces 47 and 49 can be provided laterally inward from the longitudinal strakes 46 and 48, respectively. Substantially concave surfaces 61 and 63 can be provided laterally inward from the longitudinal strakes 60 and 64, respectively. The concave surfaces 37 and 39 are preferably of greater vertical height than are the concave surfaces 47 and 49. The concave surfaces 47 and 49 are preferably of greater vertical height than are the concave surfaces 61 and 63. The reduced vertical height of the concave surfaces 47, 49 and 61, 63 results in virtually all foam being passed through the larger surface area concave surfaces 37 and 39 at lower speeds of travel when the hull is resting low in the water (FIGS. 12–14). The gas bubbles of the foam 65 will be squeezed into the channels formed between the concave surfaces 37 and 39 and the surface of the water 67, providing lift and stability to the vehicle.

Figure 15:
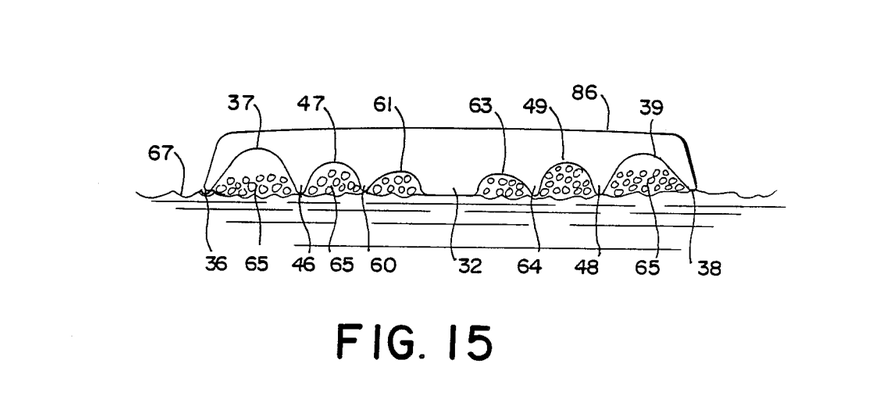
FIG. 15 is a similar cross-section to that taken along line 14—14 in FIG. 11, and at an increased rate of travel.

The hull will raise as the velocity of travel increases. The concave surfaces 37 and 39 will raise from the surface of the water 67 decreasing the surface area of these channels in contact with the foam 65. This will decrease the effectiveness of the foam in these channels to provide lift and stability. The lower vertical height concave surfaces 47 and 49 will then be above the surface of the water 67 and will form channels with the water 67 to receive foam 65 and provide lift and stability. The concave surfaces 47, 49 will lift from the surface of the water with still increasing velocities of travel, decreasing the surface areas in these channels in contact with the foam 65 and thus decreasing the ability of these surfaces to provide lift and stability. The concave surfaces 61 and 63 will then be raised from the surface of the water and will form channels with the water 67 to receive foam and thus to provide additional lift and stability. Still more concave surfaces could be provided at lower vertical heights, but it has been found that the three channels discussed above are generally sufficient to maintain lift and stability at varying velocities of travel.

Figure 16:
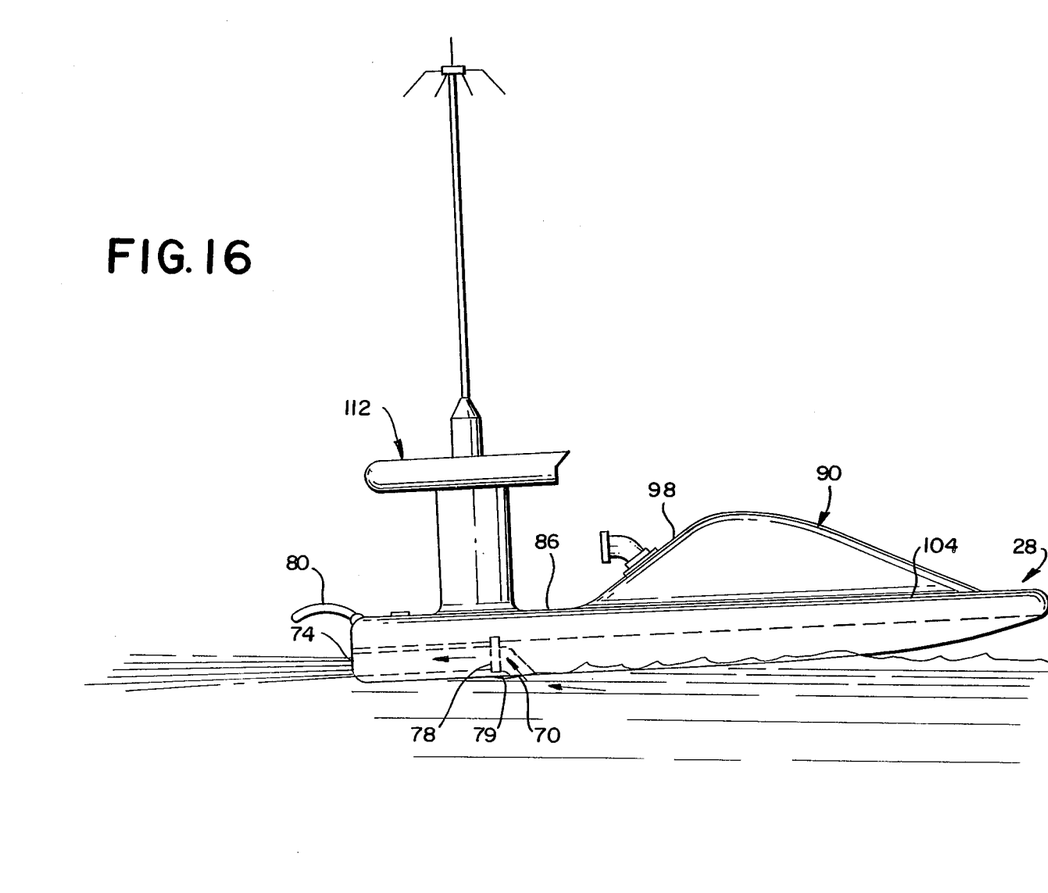
FIG. 16 is a side elevation of a vehicle travelling over water and showing internal features in phantom.

The vehicle preferably is propelled by a water jet propulsion system. The water jet propulsion system includes at least one water inlet port 70, one water outlet port 74, and a water pump means 78 (phantom lines in FIG. 16) for propelling water from the water inlet port 70 through the water outlet port 74. The water inlet port 70 is provided in the aft lower portion of the hull. Water drawn through the water inlet port 70 will draw the lower aft portion of the hull 28 downward into the water. The draw of the water inlet port 70 will also act to keep at least the longitudinal foils 36, 38 and the longitudinal strakes 46, 48, 60 and 64 in contact with the foam. This will maintain contact between a portion of the hull with the foam to increase the overall stability of the vehicle during propulsion.

The water inlet port 70 is preferably directed at least slightly forward to produce a scooping action which will assist in the introduction of water into the port. This is especially helpful to position the inlet port 70 at least partially below the level of the foam to reduce the amount of foam passed to the water pump, especially under conditions where the hull 28 has lifted from the water. The water inlet port 70 can be provided at least partially on a downwardly sloping surface 79 fashioned in the lower portion of the hull 28. The downwardly sloping surface 79 slopes substantially downward in the aft direction of the hull 28. The angle between the axis of the water inlet port 70 and the direction of travel of the water along the hull is thereby reduced. Water flowing along side the hull will then follow the contour of the hull and water inlet port 70. Adjacent layers of water will be drawn into the water inlet port 70.

Additional structure associated with water jet propulsion systems can be provided. The water outlet port 74 can be pivotally mounted to the hull 28 to assist in steering of the vehicle. A reverse clam shell 80 can be movably mounted adjacent to the water outlet port 74. The clam shell 80 is moved over the water outlet port 74 to reverse thrust and thereby reverse the vehicle. Fixed fins 76, 77 can be provided for additional stability. Ballast ports 82 and 84 can be provided to admit or expel ballast means such as water.

The upper portion of the hull 28 includes a deck 86. A superstructure 90 is fashioned over the deck 86 and is adapted to house an engine. The superstructure 90 preferably is fashioned substantially from curved surfaces adapted to deflect projectiles and wave radiation such as radar. The curved surfaces are compound curves with convex and concave portions.

At least one fluid channel can be provided in the superstructure 90 and is adapted to direct fluids (air and water) flowing over the vehicle in a direction substantially parallel to the longitudinal axis of the vehicle. The fluid channel can be a longitudinally directed groove 94 in the superstructure. The longitudinal groove 94 is preferably positioned on the superstructure 90 at the lateral centerline of the vehicle. This will tend to reduce drag caused by the fluids spilling over the superstructure and will help to steer the vehicle straight ahead to reduce yaw. The longitudinal groove 94 is a compound curve with a substantial concave portion directed along the longitudinal length of the groove 94.

An aft portion 98 of the superstructure 90 is sloped substantially downward in the aft direction. The sloped aft portion 98 is adapted to evacuate fluids flowing over the superstructure to reduce the drag that otherwise would be created by fluids spilling over the superstructure.

Lateral sides of the upper portion of the hull are chamfered laterally downward so that water flowing over the upper portion of the hull will be directed over the sides of the hull. Chamfered surfaces 104 and 108 can be formed in the deck 86 and slope laterally downward to direct water over the sides of the hull. The chamfered surfaces 104 and 108 preferably run substantially for the longitudinal length of the hull 28.

Extreme forward and aft portions of the hull 28 are reduced in vertical dimension relative to longitudinally intermediate portions of the hull. A wedge is thereby formed in the forward portion of the hull which assists in breaking through waves. An aft portion 110 of the deck 86 can be used to carry an appropriate payload 112. By the utilization of detachable fastening structure, various payloads can be carried by the same vehicle.

A vehicle is propelled over water according to a method of the invention by separating water with a first portion of the hull, generating foam. The foam is contained underneath the hull by a second portion of the hull. The vehicle is thereby supported during propulsion at least in part by a surface of the foam. The draft of the vehicle will be minimized since it travels substantially on the layer of foam covering the surface of the water.

The hull will lift from the water during propulsion. Contact can be maintained with the foam by a third portion of the hull. The foam is preferably directed laterally outwardly after it is separated by movement of the hull structure therethrough. Outwardly directed foam is impacted against hull structure in each lateral direction. The force of the impact is substantially countervailing to reduce yaw and skidding of the vehicle over the surface of the foam. The hull of the invention can be constructed from any of several suitable materials. Preferable materials include woven roving or matte fiberglass. Strong and lightweight synthetic materials would also be suitable.

This invention can be embodied in other specific forms without departing from the spirit or essential attributes and accordingly, reference should be made to the following claims, rather than to the foregoing specification, as indicating the scope of the invention.

We claim:
1. A water vehicle comprising:
   a rigid longitudinally elongated hull having forward and aft portions, upper and lower surface portions, and lateral side portions, said lower surface portion comprising (i) a lower central region disposed substantially below and extending generally along the lateral center line of the hull, (ii) lower lateral side regions extending substantially adjacent the lateral side portions of the hull, and (iii) lower laterally interior regions extending generally longitudinally along the hull bottom between said lower central region and said lower lateral side regions;

said lower central region having a rigid contoured forward surface for contacting the water and for separating the same as the vehicle is propelled therethrough, said contoured forward surface being contiguous with the remaining portions of said lower central region and being contoured such that the water is swirled as it is separated, thereby entrapping air and generating a water-air foam that is forced away from said lower central region and toward said lower laterally interior regions and said lower lateral side regions, said foam providing an upwardly acting force against said lower laterally interior regions and said lower lateral side regions which tends to lift said hull out of the water;

longitudinal strake means extending along said lower surface portions of said hull at least along each laterally interior region, said strake means being adapted to channel said foam between said strake means and said lower central region and between said strake means and said lower lateral side regions, said strake means having a lateral cross-section substantially sloping downwardly in the direction of said lateral side portions of said hull, whereby any foam that is directed laterally outwardly will impact the downwardly sloping surfaces so formed on each lower surface region of said hull adjacent said lateral side portions, the force of said impact being substantially countervailing whereby any tendency for said hull over said foam is reduced;

longitudinal foil means extending along said lower surface portions of said hull substantially at each lower lateral side region thereof, said foil means being adapted to channel said foam between said strake means and said foil means; and means including a water inlet port disposed in the aft lower central region for generating a force acting to press said aft lower central region downwardly against the surface of the water as the vehicle is propelled, the magnitude of the downwardly pressing force increasing as the speed with which the vehicle is propelled increases, said upwardly acting force attributable to said foam and said downwardly pressing force associated with said means including said inlet port thus providing two countervailing and stabilizing forces which enable the vehicle to skim stably just about the surface of said foam.

2. The vehicle of claim 1, wherein said longitudinal strake means extend at least through the aft, lower surface portions of said hull, said strake means being adapted to maintain contact with said foam with increasing velocity of travel.

3. The vehicle of claim 2, further comprising two longitudinal strake means on each laterally interior region of said hull.

4. The vehicle of claim 2, wherein said rigid contoured forward surface of said lower central region comprises a protrusion for physically breaking the water and generating said foam.

5. The vehicle of claim 2, further comprising water jet propulsion means, said water jet propulsion means including said water inlet port in said lower central region of said hull, at least one water outlet port, and water pump means adapted to propel water from said water inlet port through said water outlet port whereby the foam that is generated as the vehicle is propelled through the water will be pressed between the lower surface portions of the hull and the surface of the water, wherein said water outlet port is substantially directed abaft to propel the vehicle substantially forward, and said water inlet port is in said aft lower surface portion of said hull, whereby water drawn through said water inlet port will draw said lower aft portion of said hull downward into said water.

6. The vehicle of claim 5, wherein said water inlet port is at least partially directed forward to produce a scooping action which will assist in the introduction of water into said inlet port, whereby a portion of the water passing below said lower central region of said hull will travel into said water inlet port.

7. The vehicle of claim 2, wherein said longitudinal foil means and said longitudinal strake means along each laterally interior region define sides of first channel means, said first channel means being adapted to receive foam generated by said rigid contoured forward surface of said lower central region said foam in said first channel means providing lift and stability to said vehicle.

8. The vehicle of claim 2, wherein said longitudinal foil means and said longitudinal strake means define a plurality of channels of differing vertical heights, said channels of differing vertical heights being adapted to contain said foam to support the hull at different velocities of said vehicle.

9. The vehicle of claim 1, wherein said upper surface portion of said hull comprises a superstructure adapted to house engine means, said superstructure substantially comprising curved surfaces adapted to deflect projectiles and wave radiation.

10. The vehicle of claim 9, wherein said curved surfaces are substantially compound curves.

11. The vehicle of claim 9, wherein said superstructure comprises fluid channel means adapted to direct fluid flowing over said vehicle in a direction substantially parallel to the longitudinal axis of said vehicle.

12. The vehicle of claim 11, wherein an aft portion of said superstructure is sloped substantially downward in the aft direction, said sloped aft portion being adapted to evacuate fluids flowing over said superstructure and to reduce the drag created by such fluids.

13. The vehicle of claim 9, wherein said fluid channel means comprises at least one longitudinally directed groove in said superstructure.

14. The vehicle of claim 11, wherein said least one longitudinal groove is positioned on said superstructure substantially at the lateral centerline of said vehicle.

15. The vehicle of claim 14, wherein least one longitudinal groove in said superstructure comprises a compound curve.

16. The vehicle of claim 14, wherein lateral side portions of said upper surface portion of said hull are chamfered laterally downward whereby water flowing over said upper surface portion of said hull will be directed over the sides of said hull.

17. A method for propelling a water vehicle over the surface of water, wherein the propulsion is characterized by a stable, horizontal path substantially devoid of yaw and skid, wherein the vehicle comprises a longitudinally elongated hull having forward and aft portions, upper and lower surface portions, and lateral side portions, wherein said lower surface portions comprise (i) a lower central region disposed substantially below and extending generally along the lateral center line of the hull, (ii) lower lateral side regions extending substantially adjacent the lateral side portions of the hull, and (iii) lower laterally interior regions extending generally longitudinally along the hull bottom between said lower central region and said lower lateral side regions, and wherein said lower central region includes a rigid contoured forward surface for engaging the water as the vehicle is propelled therethrough which comprises the steps of:

(a) generating a water-air foam by propelling the rigid contoured forward surface of said lower central region of the hull through the water;
(b) passing said foam underneath the laterally interior regions and the lateral side regions of said hull, said foam impinging against said laterally interior regions and, said lateral side regions and tending to lift said hull out of the water; and
(c) forcing said lower central region of said hull downwardly against the surface of the water such that said foam is compressed between the water and said hull, the lifting action of said foam and the forcing down of the hull providing countervailing forces which stabilize the propulsion of the vehicle over the water, whereby any tendency toward yaw and skidding of the vehicle over said foam will be reduced.

* * * * *